US011122465B2

(12) United States Patent
Turtinen et al.

(10) Patent No.: US 11,122,465 B2
(45) Date of Patent: Sep. 14, 2021

(54) REAL-TIME SEGMENTATION

(71) Applicant: NOKIA SOLUTIONS AND NETWORKS OY, Espoo (FI)

(72) Inventors: Samuli Heikki Turtinen, Ii (FI); Benoist Pierre Sebire, Tokyo (JP); Juho Mikko Oskari Pirskanen, Kangasala (FI); Timo Koskela, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/307,882

(22) PCT Filed: Jun. 9, 2016

(86) PCT No.: PCT/EP2016/063141
§ 371 (c)(1),
(2) Date: Dec. 7, 2018

(87) PCT Pub. No.: WO2017/211417
PCT Pub. Date: Dec. 14, 2017

(65) Prior Publication Data
US 2019/0215727 A1    Jul. 11, 2019

(51) Int. Cl.
*H04W 84/06*        (2009.01)
*H04W 28/06*        (2009.01)
(Continued)

(52) U.S. Cl.
CPC ......... *H04W 28/065* (2013.01); *H04L 1/0083* (2013.01); *H04L 69/323* (2013.01); *H04L 69/322* (2013.01)

(58) Field of Classification Search
None
See application file for complete search history.

(56) References Cited

U.S. PATENT DOCUMENTS

| 9,756,680 B2 * | 9/2017 | Wang ................. H04L 1/0083 |
| 10,396,942 B2 * | 8/2019 | Baek ...................... H04L 47/34 |
| 2010/0111110 A1 | 5/2010 | Wang et al. |

FOREIGN PATENT DOCUMENTS

CN        101272519 A        9/2008

OTHER PUBLICATIONS

International Search Report and Written Opinion for International Application No. PCT/EP2016/063141, dated Feb. 20, 2017, 14 pages.

(Continued)

*Primary Examiner* — Willie J Daniel, Jr.
(74) *Attorney, Agent, or Firm* — Brake Hughes Bellermann LLP (57) ABSTRACT

The present invention provides apparatuses, methods, computer programs, computer program products and computer-readable media regarding real-time segmentation. The present invention comprises composing, on a first layer, a first layer packet data unit, PDU, having a predetermined length, including a plurality of first layer service data units, SDUs, each of the plurality of first layer SDUs including a header indicating a length of each of the first layer SDUs, and inserting a certain number of the plurality of the first layer SDUs into the first layer PDU corresponding to the predetermined length of the first layer PDU, if it is determined that a last one of the certain number of the plurality of first layer SDUs does not fit completely into the first layer PDU, segmenting the last one of the certain number of the plurality of first layer SDUs according to the predetermined length of the first layer PDU, and inserting a first part of the segmented first layer SDU into the first layer PDU, wherein the header indicates the length of the first layer.

19 Claims, 9 Drawing Sheets

(51) Int. Cl.
*H04L 1/00* (2006.01)
*H04L 29/08* (2006.01)

(56) References Cited

OTHER PUBLICATIONS

3GPP TSG-RAN WGS#57; R2-070673; "MAC-hs Header for Improved L2 Support for High Data Rates"; Feb. 12-16, 2007; St. Louis, MO, USA; 5 pages.
3GPP TSG-RAN WG RAN2 #58bis; R2-072360; Multiple Packets Loss Recovery and RLC PDU Format in eMBMS; Jun. 25-29, 2007; Orlando, FL, USA; 4 pages.
3GPP TSG RAN WG2#58bis; R2-072653; "RLC PDU Format for LTE"; Jun. 25-29, 2007; Orlando, FL, USA; 6 pages.
Office Action for European Application No. 16727735.9, dated Nov. 6, 2019, 3 pages.
Office Action for Chinese Application No. 2020093002359060, dated Oct. 12, 2020, 12 pages.
Office Action for European Application No. 16727735.9, dated May 12, 2021, 5 pages.
Office Action for Chinese Patent Application No. 201680086575.7, dated May 18, 2021, 7 pages.

* cited by examiner

REAL-TIME SEGMENTATION

CROSS-REFERENCE TO RELATED APPLICATIONS

This application is a national stage entry of International Application No. PCT/EP2016/063141 filed Jun. 9, 2016, entitled "REAL-TIME SEGMENTATION" which is hereby incorporated by reference in its entirety.

FIELD OF THE INVENTION

The present invention relates to apparatuses, methods, systems, computer programs, computer program products and computer-readable media regarding real-time segmentation.

BACKGROUND OF THE INVENTION

The radio protocols for the user plane traditionally consists of three layers: Packet Data Convergence Protocol (PDCP), Radio Link Control (RLC) and Medium Access Control (MAC) (cf. document [1]). From these layers, RLC and MAC layers are subject to Real Time (RT) processing requirements which mean processing on a per TTI (transmission time interval) basis, i.e., the processing for certain TTI can be made in the downlink, only after a scheduling decision in the network (NW) side transmission has been made, and in the uplink only after an uplink (UL) grant in the user equipment (UE) side has been received.

According the Long Term Evolution (LTE) Stage 2 (cf. document [1], section 6.2), the RLC sublayer main services and functions include the following:
Transfer of upper layer packet data units (PDUs);
Error Correction through ARQ (automatic repeat request) (only for acknowledged mode (AM) data transfer);
Concatenation, segmentation and reassembly of RLC service data units (SDUs) (only for unacknowledged mode (UM) and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
These functions also rely on an RLC sequence number (SN) in the RLC header of every RLC PDUs.

Figure 1:
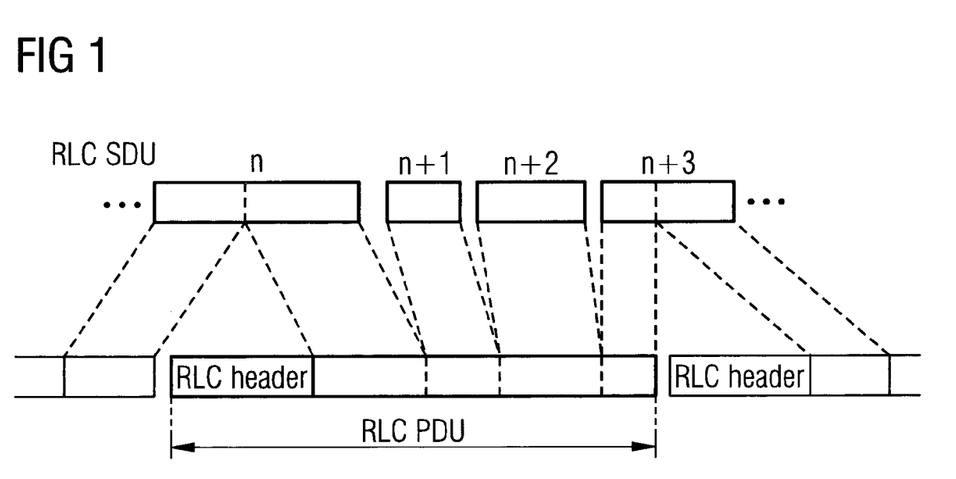
FIG. 1 is a diagram illustrating an example of the RLC PDU structure.

FIG. 1 is a diagram illustrating an example of the RLC PDU structure, as shown in document [1], section 6.2.1. In this RLC PDU structure, the PDU sequence number carried by the RLC header is independent of the SDU sequence number (i.e. PDCP sequence number). The dash-dotted line in FIG. 1 for RLC SDUs n and n+3 indicates the occurrence of segmentation.

Below the RLC lies the MAC sublayer whose main services and functions include the following (cf. document [1], section 6.1):
Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through hybrid ARQ (HARQ);
Priority handling between logical channels of one UE;
Priority handling between UEs by means of dynamic scheduling;
Transport format selection;
Padding.

A study item on New Radio Access Technology (NR) has been agreed (cf. document [2]). One of the goal of NR is to support the very high bit rates required for 5G (up to tens of Gbps). The radio protocol design for NR are now being discussed in 3GPP.

To facilitate the support of the very high bit rates envisioned for NR, the functional split could change to exploit very lightweight RT processing requirements by enabling the transmission (Tx) side to do pre-processing of packets as much as possible before the actual RT processing requirement. One possibility is to move segmentation and concatenation to MAC, leaving to RLC the main functions of error correction, reordering and duplicate detection, which do not need to be performed just in-time (cf. documents [3] and [4]).

For instance the following pros compared to LTE stack have been claimed with this approach:
Allows to move building of MAC PDUs into hardware (just-in-time processing is currently a pain for the UE),
Allows opening RLC-MAC interface (this is currently not an option due to very tight coupling),
Without concatenation/segmentation in RLC (and ARQ layer), re-segmentation may not be needed.

However, without the (re-)segmentation function in RLC or in ARQ layer in general, the ARQ would work solely on a per packet basis and would re-transmit full packets even though the receiver (Rx) would miss only a small segment of the original packet to be able to reassemble the full packet.

This problem is not subject only to big packet sizes but is a general problem with big packet size with respect to the available Transport Block (TB) size/physical resources in certain TTI. Thus, re-transmitting/status reporting also segments is beneficial (and explains why it was introduced in LTE in the first place).

One possible option to implement segmentation in both MAC and RLC (or ARQ layer) is that MAC will do the real time segmentation and modify the RLC header of the corresponding MAC SDU/RLC PDU according to the made segmentation decision in the MAC. This way the reassembly would be done still in the RLC layer in the Rx and status reporting/re-transmissions could happen in segment level.

However, one problem with this approach is that it will violate the layering as MAC would be modifying RLC headers (this might not be desirable in the standards) as well as it would bring additional complexity in MAC processing since the RLC header size could also change. This re-manipulation of RLC PDU header would require software (SW) based implementation in Tx side and not allow only fast hardware (HW) based Tx operation to decrease transmitter processing time.

Furthermore, the target by the UE vendors for 5G/NR has been that the RT processing needs to be minimized and potentially enabled to be done solely in the HW part of the modem only (to squeeze the processing times to absolute minimum). This requires that as much processing as possible should be able to be done in advance. For instance, the intend has been that even the MAC level headers for MAC SDUs could be generated in advance and the prepared packets could be just tossed to the MAC PDU/PHY TB once the scheduling decision has been made/grant received. The problem arises with the segmentation function, the segmentation decision cannot be made in advance in the Tx before the scheduling decision/grant reception and thus related processing can only be made in real-time manner.

LTE RLC is currently responsible of the segmentation of packets for MAC PDU and illustration of the segmentation is given in document [1] and specified in detail in document [5].

In High Speed Packet Access (HSPA), segmentation is done in both RLC and MAC layers, however, the reassembly function is supported in both and the segmentation in the MAC is done per logical channel basis. This will delay the ARQ level status reporting as packets cannot be immediately provided to RLC layer. Further details are described on documents [6] (HSPA MAC) and [7] (HSPA RLC).

Further, there has been proposed a scheme where concatenation is done in MAC layer and segmentation in RLC and where the last RLC PDU is (re)-segmented by using RLC Segment offset fields. The solution gives only partial improvement as transmitter may need to add completely new RLC header structure in the last RLC PDU.

Thus, according to certain aspects of the present invention, there are proposed means to overcome the above issues and support efficient segmentation scheme in the system which enables very efficient segmentation in processing wise in the Tx side as well as segment level re-transmissions in the ARQ level.

REFERENCES

[1]: 3GPP TS 36.300
[2]: 3GPP RP-160671
[3]: 3GPP R2-163439
[4]: 3GPP R2-163842
[5]: 3GPP TS 36.322
[6]: 3GPP TS 25.321
[7]: 3GPP TS 25.322

SUMMARY OF THE INVENTION

It is therefore an object of the present invention to overcome the above mentioned problems and to provide apparatuses, methods, systems, computer programs, computer program products and computer-readable media regarding real-time segmentation.

According to an aspect of the present invention there is provided a method comprising:
composing, on a first layer, a first layer packet data unit, PDU, having a predetermined length, including a plurality of first layer service data units, SDUs, each of the plurality of first layer SDUs including a header indicating a length of each of the first layer SDUs,
inserting a certain number of the plurality of the first layer SDUs into the first layer PDU corresponding to the predetermined length of the first layer PDU,
if it is determined that a last one of the certain number of the plurality of first layer SDUs does not fit completely into the first layer PDU,
segmenting the last one of the certain number of the plurality of first layer SDUs according to the predetermined length of the first layer PDU, and
inserting a first part of the segmented first layer SDU into the first layer PDU,
wherein the header indicates the length of the first layer SDU.

According to another aspect of the present invention there is provided a method comprising:
receiving, on a first layer, a first layer packet data unit, PDU, including a plurality of first layer service data units, SDUs, each of the plurality of first layer SDUs including a header indicating a length of each of the first layer SDUs,
determining a length of a last one of the plurality of first layer SDUs included in the first layer PDU,
comparing a length indicated in the header of the last one of the plurality of first layer SDUs with the determined length of the last one of the plurality of first layer SDUs includes in the first layer PDU, and
if it is determined that the lengths do not coincide, determining that the last first layer SDU included in the first layer PDU has been segmented.

According to another aspect of the present invention there is provided a transmitting apparatus, comprising:
at least one processor,
and
at least one memory for storing instructions to be executed by the processor, wherein
the at least one memory and the instructions are configured to, with the at least one processor, cause the apparatus at least to perform:
composing, on a first layer, a first layer packet data unit, PDU, having a predetermined length, including a plurality of first layer service data units, SDUs, each of the plurality of first layer SDUs including a header indicating a length of each of the first layer SDUs, and
inserting a certain number of the plurality of the first layer SDUs into the first layer PDU corresponding to the predetermined length of the first layer PDU,
wherein, if it is determined that a last one of the certain number of the plurality of first layer SDUs does not fit completely into the first layer PDU,
segmenting the last one of the certain number of the plurality of first layer SDUs according to the predetermined length of the first layer PDU, and
inserting a first part of the segmented first layer SDU into the first layer PDU,
wherein the header indicates the length of the first layer SDU.

According to another aspect of the present invention there is provided a receiving apparatus, comprising:
at least one processor,
and
at least one memory for storing instructions to be executed by the processor, wherein
the at least one memory and the instructions are configured to, with the at least one processor, cause the apparatus at least to perform:
receiving, on a first layer, a first layer packet data unit, PDU, including a plurality of first layer service data units, SDUs, each of the plurality of first layer SDUs including a header indicating a length of each of the first layer SDUs,
determining a length of a last one of the plurality of first layer SDUs included in the first layer PDU,
comparing a length indicated in the header of the last one of the plurality of first layer SDUs with the determined length of the last one of the plurality of first layer SDUs includes in the first layer PDU, and
if it is determined that the lengths do not coincide, determining that the last first layer SDU included in the first layer PDU has been segmented.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to a still further aspect of the present invention there is provided an apparatus comprising:

means for composing, on a first layer, a first layer packet data unit, PDU, having a predetermined length, including a plurality of first layer service data units, SDUs, each of the plurality of first layer SDUs including a header indicating a length of each of the first layer SDUs, and means for inserting a certain number of the plurality of the first layer SDUs into the first layer PDU corresponding to the predetermined length of the first layer PDU, if it is determined that a last one of the certain number of the plurality of first layer SDUs does not fit completely into the first layer PDU, means for segmenting the last one of the certain number of the plurality of first layer SDUs according to the predetermined length of the first layer PDU, and means for inserting a first part of the segmented first layer SDU into the first layer PDU, wherein the header indicates the length of the first layer SDU.

According to a still further aspect of the present invention there is provided an apparatus comprising:

means for receiving, on a first layer, a first layer packet data unit, PDU, including a plurality of first layer service data units, SDUs, each of the plurality of first layer SDUs including a header indicating a length of each of the first layer SDUs, means for determining a length of a last one of the plurality of first layer SDUs included in the first layer PDU, means for comparing a length indicated in the header of the last one of the plurality of first layer SDUs with the determined length of the last one of the plurality of first layer SDUs includes in the first layer PDU, and if it is determined that the lengths do not coincide, means for determining that the last first layer SDU included in the first layer PDU has been segmented.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a self-organizing network is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

As already set out above, according to certain aspects of the present invention, there are proposed means to support efficient segmentation scheme in the system which enables very efficient segmentation in processing wise in the Tx side as well as segment level re-transmissions in the ARQ level.

According to certain aspects of the present invention, there is proposed a solution for MAC PDU generation, where the MAC SDUs are segmented without changing the header field of the last SDU. This means in practice that the length field of the SDU has its original size, but indicates that the size is wrong (too much). This can then be recognized on the other end.

According to certain aspects of the present invention, when building the MAC PDU from the pre-generated MAC SDUs (+headers) the following procedure is proposed.

On the transmitter side, in a first step, when performing concatenation, the last SDU is segmented by the MAC entity if it does not fit into the remaining part but the MAC entity does not change anything from the header field of the said last SDU. In practise the transmitter just cuts the part of MAC SDU that does not fit, for instance, in octet level. That is, the Length field of the corresponding SDU is still encoded according to the original size of the SDU and thus shows a 'wrong' length value (ie. too much) for the segment transmitted.

In a second step on the transmitter side, for the following transmission in a subsequent TTI, a new MAC SDU+header from the remaining part of the original MAC SDU (the last SDU mentioned in the step above) will be generated (by MAC or RLC).

Then, on the receiver side, in a third step, by processing the headers, the receiving MAC entity can determine if the last MAC SDU was segmented at MAC level or not (i.e., whether this was the original size of the SDU or not) by means of the Length field.

In this regard, if the Length field is encoded 'correctly', that is, Length corresponds to MAC SDU size, it is determined that the MAC SDU was not segmented at MAC level.

However, if the Length field is encoded 'incorrectly', that is, encoded Length indicating the MAC SDU size shows bigger value than the received MAC SDU size it is determined that the MAC SDU was segmented at MAC level.

Then, in a fourth step on the receiver side, this information is then passed up to RLC which can determine if the packet can be re-assembled and forwarded to upper layers or a missing segment needs to be issued by the Tx side by means of status reporting.

In the above, step 1 and 3 can either take place on a logical channel basis or for the whole MAC PDU. In other words, segmentation of the last SDU can either take place for the last SDU of a logical channel (referred below as sub-PDU) or for the last SDU of the MAC PDU (among all logical channels).

Going into more details, the "remaining part" of step 1 can either refer to the remaining part available for a logical channel, or to the remaining part for the last logical channel of the MAC PDU i.e. the whole MAC PDU. Then the comparison in step 3 can either be performed for each logical channel or only the last one (the only one subject to segmentation).

In this regard, it is noted that if there is only one logical channel, it makes no difference.

Figure 2:
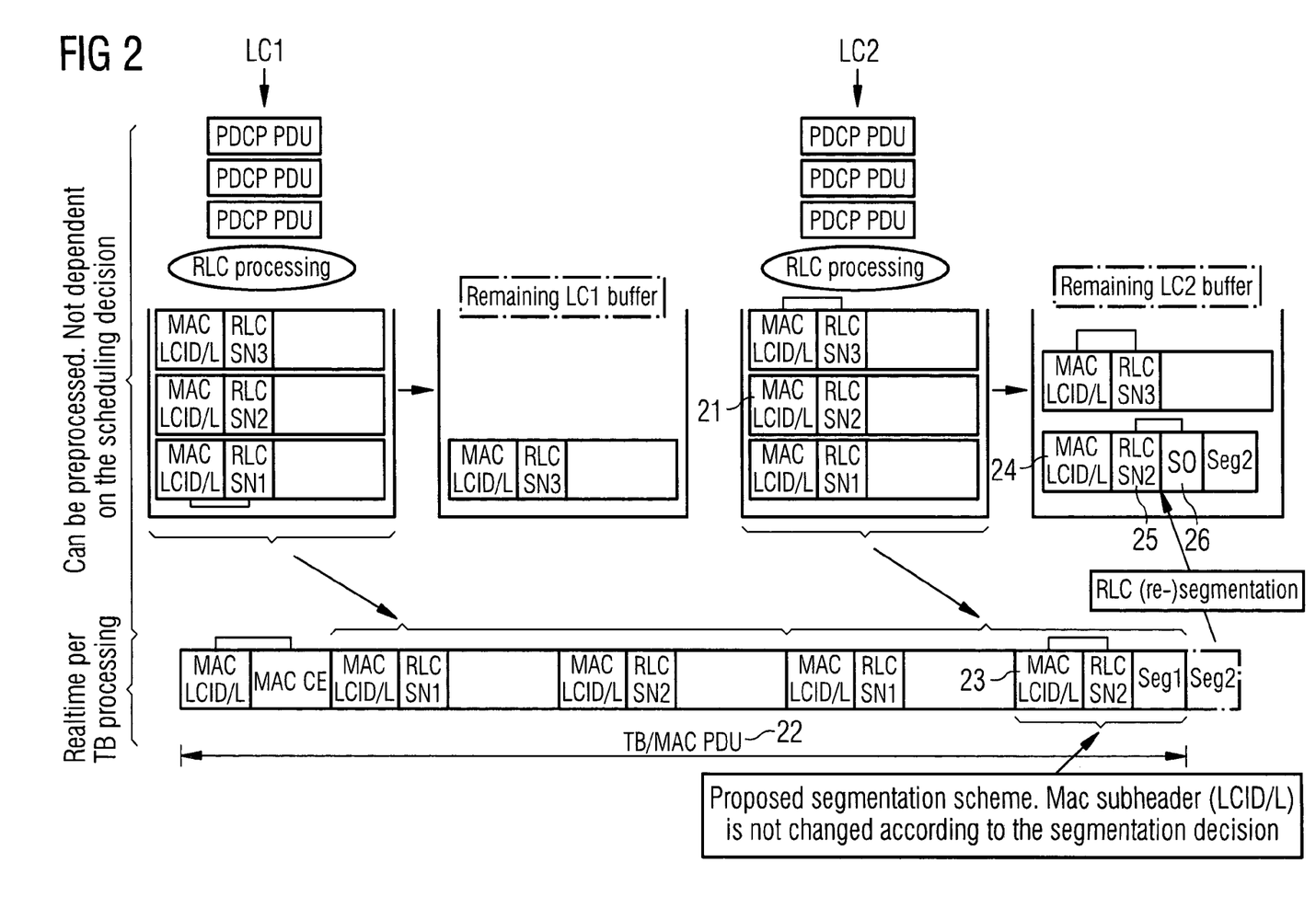
FIG. 2 is a diagram showing an example illustration of the L2 processing in the Tx side with the proposed scheme according to certain aspects of the present invention.

FIG. 2 is a diagram showing an example illustration of the L2 processing in the Tx side with the proposed scheme according to certain aspects of the present invention.

In this example, the second MAC SDU of the LC2 (Logical Channel 2) with RLC SN2, denoted as 21, is cut to the size matching available MAC PDU 22, but corresponding MAC Length (L) field 23 is not changed to match the reduced size. Remaining part of the MAC SDU is prepared for next transmission by adding new MAC subheader 24 (LCID and L) with correct length value.

In such a case, according to certain embodiments of the present invention, the RLC header 25 is re-generated to include a Segment offset field 26 so that the receiver can perform re-assembly correctly. Use of SO fields allows RLC PDU to be segmented to more than 2 pieces. Thus next transmission could contain only middle part of RLC PDU and subsequent transmission would contain the last segments of RLC PDU.

However, it is noted that this is only a non-limiting example and that the RLC segmentation does not necessarily have to use the segment offset. Alternatively, also segment sequence numbers or the like could be used, as long as the different segments can be identified appropriately.

Figure 3:
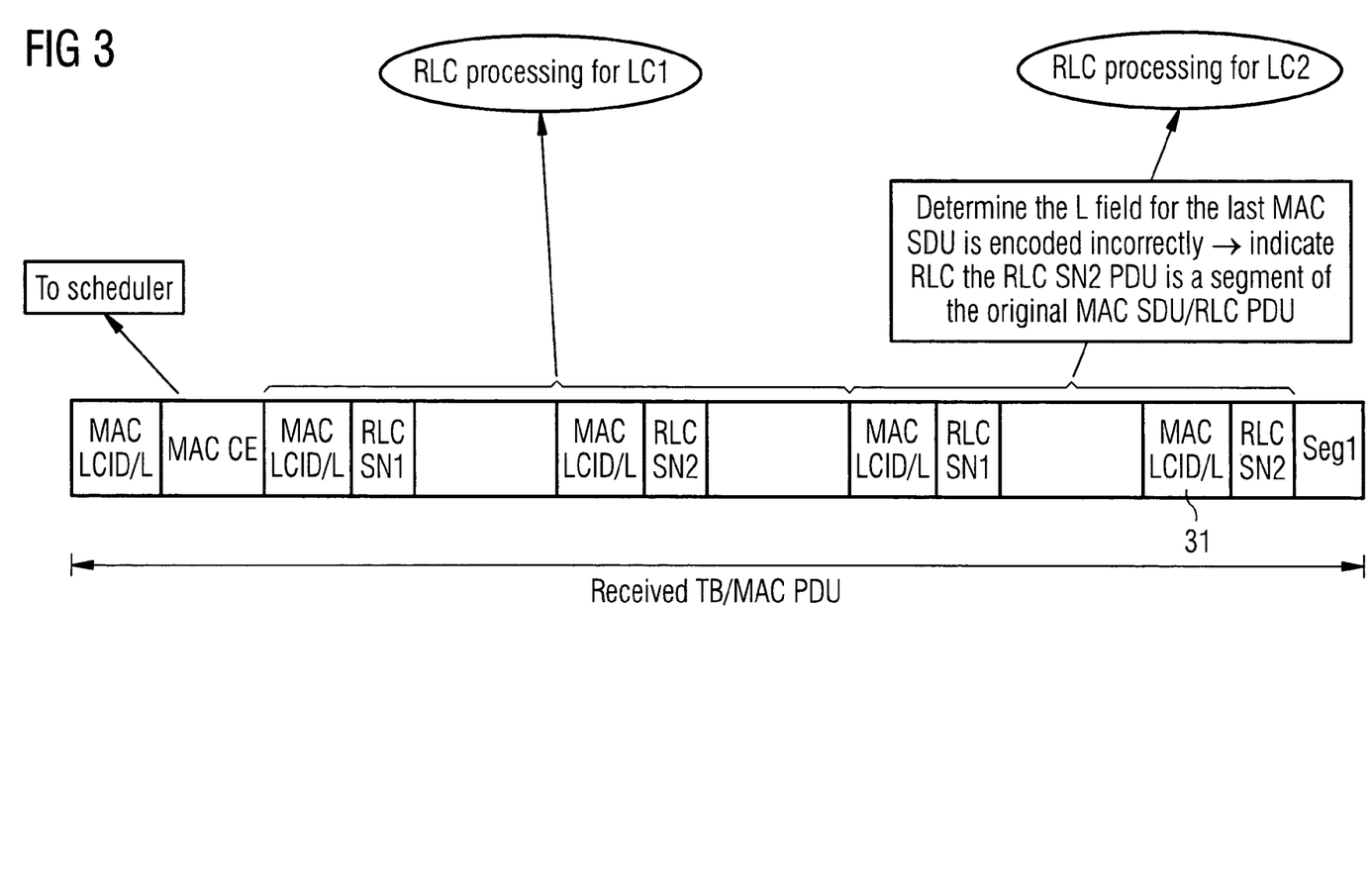
FIG. 3 is a diagram showing an example illustration of the L2 processing in the Rx side with the proposed scheme according to certain aspects of the present invention.

FIG. 3 is a diagram showing an example illustration of the L2 processing in the Rx side with the proposed scheme according to certain aspects of the present invention.

The MAC would detect that last Length field 31 does match the remaining size of the MAC PDU data portion and thus the last MAC SDU part is only the segment of a RLC PDU. In RLC layer, if the RLC PDU does not contain any Segmentation offset, the received data is the first segment of the RLC SDU, then remaining RLC PDU will carry segment offset field. In case that RLC PDU containing the SO field is segmented by MAC during MAC PDU generation, the SO field indicates correctly the segment start position.

The method can also be applied to 'sub-PDU's within one PDU as long as the sub-PDU sizes are known to the Rx side or are explicitly told to the Rx. For instance, the sub-PDU could be determined per each logical channel which the proposed method could be applied independently. The sub-PDU size could be known to Rx based on NW scheduling per logical channel.

Additionally or alternatively, the Tx side could indicate the length of each sub-PDU in the transmitted MAC PDU, etc. That is, optional length fields could be included within each sub-PDU for each logical channel in order to indicate the size of the respective sub-PDU.

Figure 4:
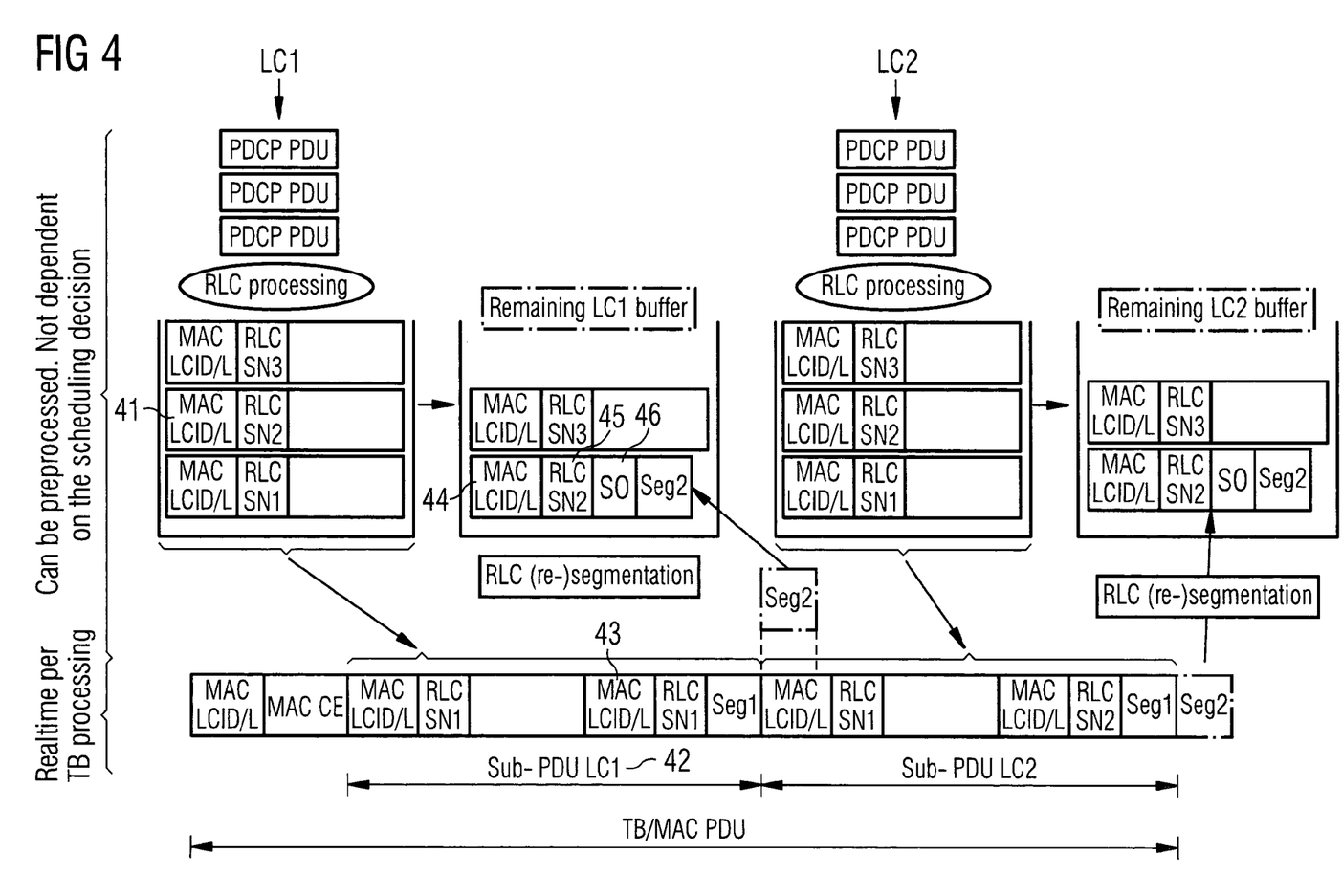
FIG. 4 is a diagram showing an example illustration of the L2 processing in the Tx side with the proposed scheme and with sub-PDUs within the full MAC PDU according to certain aspects of the present invention.

FIG. 4 is a diagram showing an example illustration of the L2 processing in the Tx side with the proposed scheme and with sub-PDUs within the full MAC PDU.

The procedure shown in FIG. 4 is similar to the procedure shown in FIG. 2, and in FIG. 4, the procedure is also applied to the MAC SDU of the logical channel LC1, i.e. the sub-PDU LC1.

That is, in the example shown in FIG. 4, the second MAC SDU of the LC1 (Logical Channel 1) with RLC SN2, denoted as 41, is cut to the size matching available Sub-PDU LC1 42, but corresponding MAC Length (L) field 43 is not changed to match the reduced size. Remaining part of the MAC SDU is prepared for next transmission by adding new MAC subheader 44 (LCID and L) with correct length value and RLC header 45 is re-generated to include Segment offset field 46 so that receiver can perform re-assembly correctly.

The processing for the second MAC SDU of the LC2 is similar as described above with respect to FIG. 2, and a description is therefore omitted here.

In the example shown in FIG. 4, it is assumed that the length of the sub-PDU is known on the Rx side based on NW scheduling per logical channel, as described above. However, alternatively or additionally, as also set out above, an additional length field could be included within each sub-PDU, as shown in FIG. 5.

Figure 5:
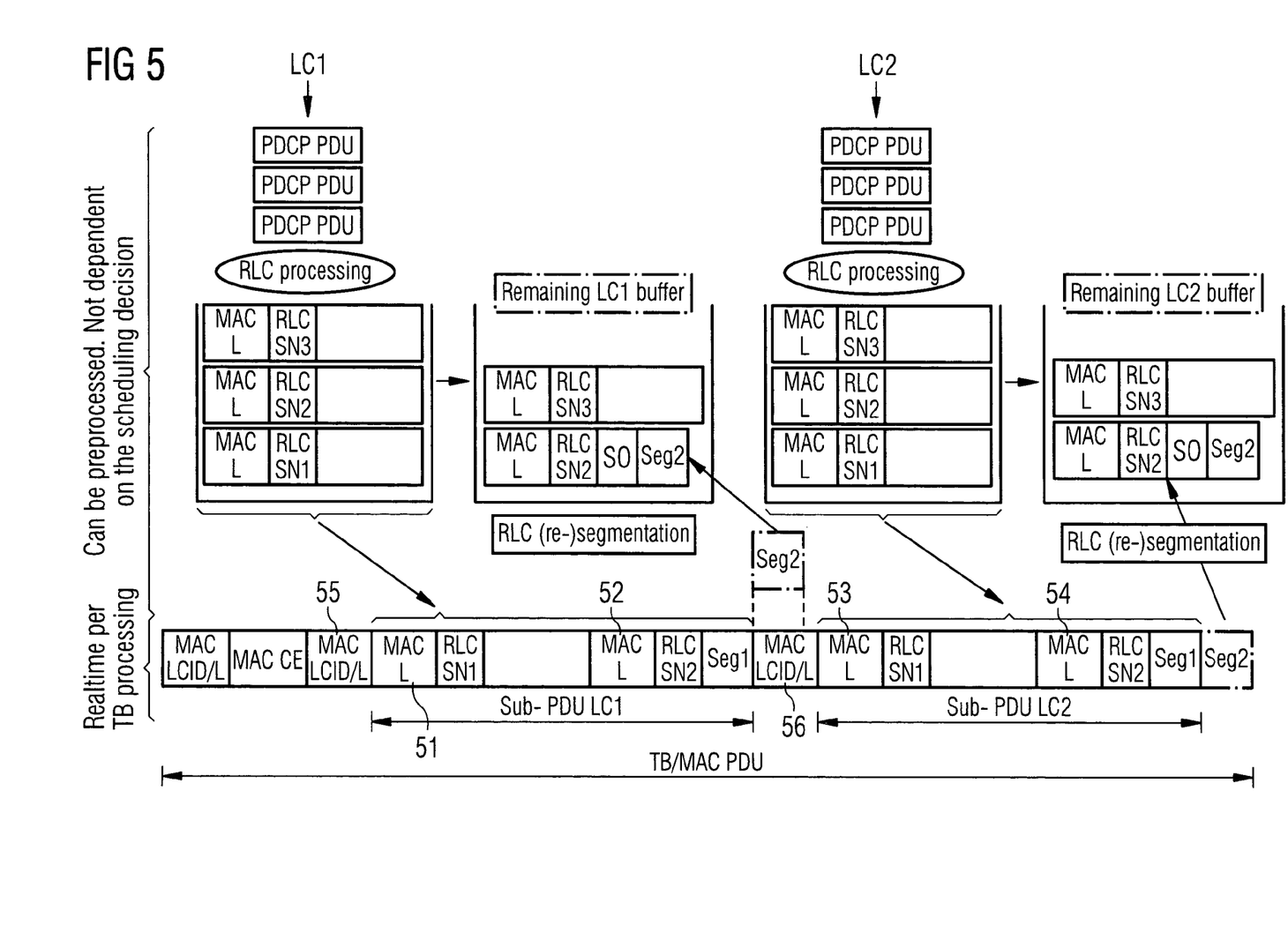
FIG. 5 is a diagram showing another example illustration of the L2 processing in the Tx side with the proposed scheme and with sub-PDUs within the full MAC PDU according to certain aspects of the present invention.

FIG. 5 shows the additional length field MAC L 51 for the first MAC SDU of the sub-PDU LC1 and the additional length field MAC L 52 for the second MAC SDU of the sub-PDU LC1. Here, the second MAC SDU is the segmented MAC SDU of the sub-PDU LC1. Further, FIG. 5 also shows the additional length field MAC L 53 for the first MAC SDU of the sub-PDU LC2 and the additional length field MAC L 54 for the second MAC PDU of the sub-PDU LC 2. Here, the second MAC SDU is the segmented MAC SDU of the sub-PDU LC2. As shown in FIG. 5, these fields only include the length field and the LCID field has been removed from the MAC SDU headers as the LCID field associated with sub-PDU length tells from which logical channel the MAC SDUs are (i.e. MAC LCID/L subheader 55 corresponds to sub-PDU LC1 and subheader 56 to sub-PDU LC2).

Figure 6:
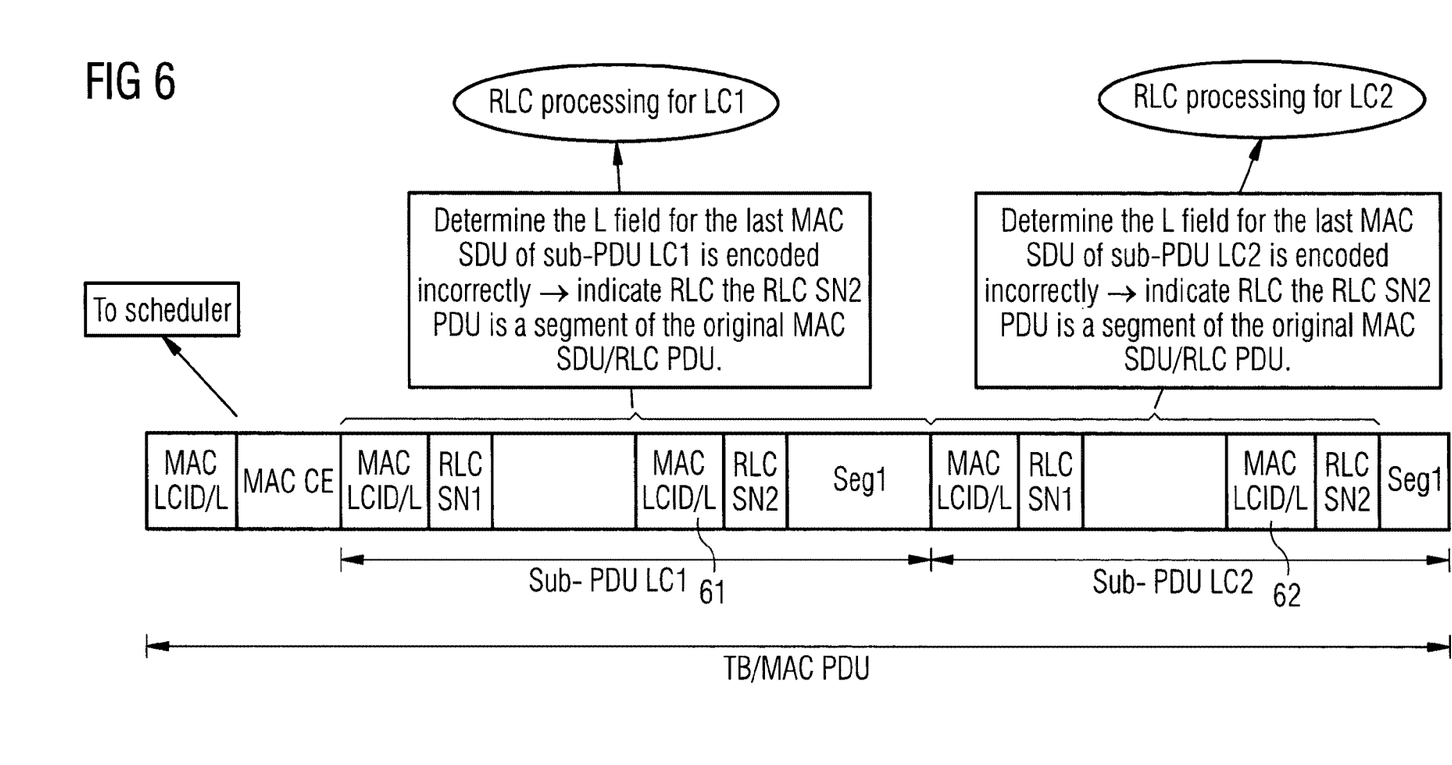
FIG. 6 is a diagram showing an example illustration of the L2 processing in the Rx side with the proposed scheme and with sub-PDUs within the full MAC PDU according to certain aspects of the present invention.

FIG. 6 is a diagram showing an example illustration of the L2 processing in the Rx side with the proposed scheme and with sub-PDUs within the full MAC PDU.

On the Rx side, in a similar manner as described above with respect to FIG. 3, the MAC would detect that last Length field 61 does match the remaining size of the Sub-PDU LC1 data portion, i.e. that the Length field for the last MAC SDU of the Sub-PDU LC1 is encoded incorrectly. Thus, it is indicated that the RLC SN2 PDU is a segment of the original MAC SDU/RLC PDU. Further, the MAC would detect that last Length field 62 does match the remaining size of the Sub-PDU LC2 data portion, i.e. that the Length field for the last MAC SDU of the Sub-PDU LC2 is encoded incorrectly. Thus, it is indicated that the RLC SN2 PDU is a segment of the original MAC SDU/RLC PDU.

Further, it is noted that FIG. 6 only shows the case where there is no additional length field. However, also in the case of FIG. 6, the additional length field could be inserted in a similar manner as described above with respect to FIG. 5.

As to the FIGS. 2 to 6, it is noted that the MAC CE (Control Element) is illustrated in the MAC PDUs just for completeness, and does not form part of the present invention since MAC CEs should not be subject to segmentation at MAC level.

According to certain aspects of the present invention, the following advantages could be provided:

- Fully pre-processed/pre-build MAC SDUs are enabled, i.e., all the headers including MAC headers can be generated before the scheduling decision has been made in the NW side/grant has been received in the UE side.
- The same procedure applies for full RLC PDUs as well as segmented RLC PDUs the same way.
- The real time segmentation can be fully conducted in the HW part of the modem, i.e., the last packet is just chopped for the remaining part that did not fit into the TB.
- Full layer functions separation between MAC and upper layers is enabled—only the indications between layers need to be specified which there already are plenty in 3GPP specifications.

Thus, according to certain aspects of the present invention, there could be provided an approach to save some processing time and/or energy.

According to certain embodiments of the present invention, the NW may configure the logical channel(s) which are subject to the segmentation at MAC level. That is, for example, MAC SDUs from certain logical channels could be segmented while MAC SDUs from other logical channels could not be segmented (e.g., due to different upper layer behavior).

Further, according to certain embodiments of the present invention, the NW may configure the minimum "remaining part" size for which MAC SDU is still subject to segmentation. That is, for example, if the size of the remaining part is smaller than the minimum size, the MAC SDU will not be segmented and will be inserted completely into the next MAC PDU and the remaining part of the previous MAC PDU will be filled with padding.

According to certain embodiments of the present invention, the NW may configure the granularity of the segmentation to be e.g., octet level or multiple of octets level or the like.

In the following, a more general description of example versions of the present invention is made with respect to FIGS. 7 to 9.

Figure 7:
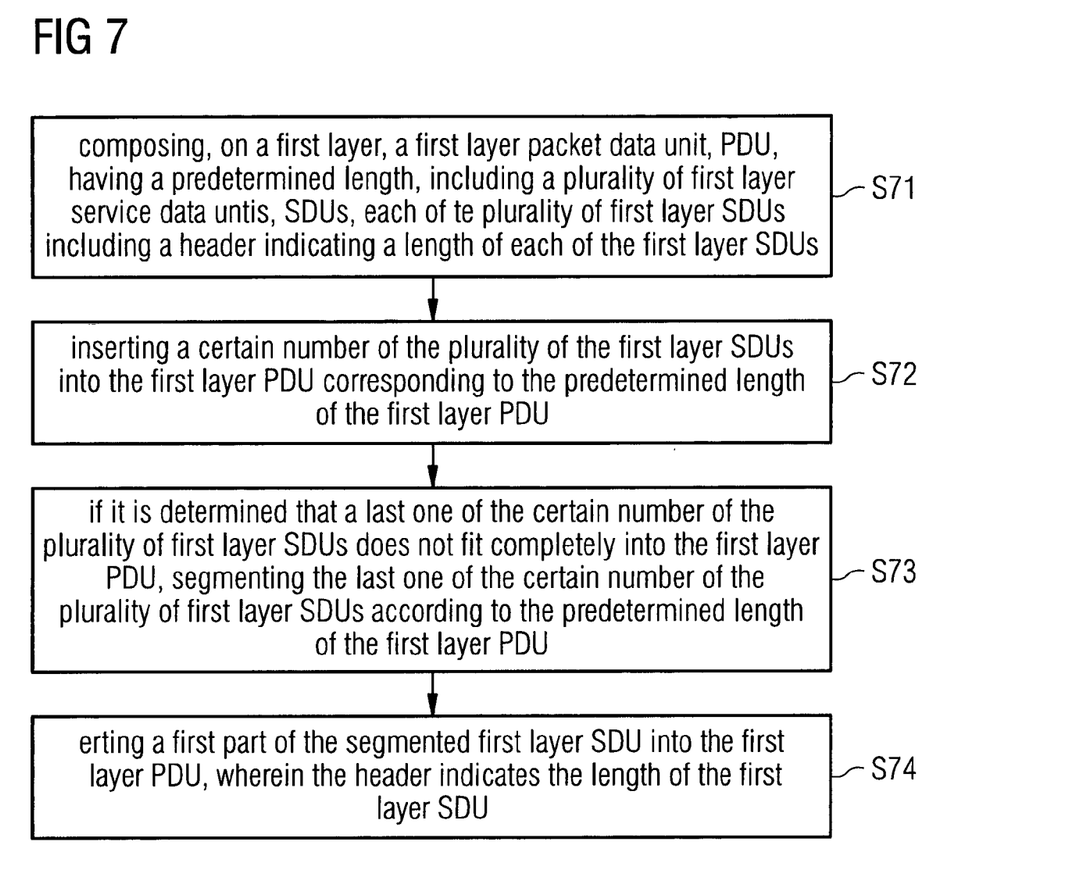
FIG. 7 is a flowchart illustrating an example of a method according to certain aspects of the present invention.

FIG. 7 is a flowchart illustrating an example of a method according to example versions of the present invention.

According to example versions of the present invention, the method may be implemented in a transmitting apparatus, like a base station, access point, user equipment or the like. The method comprises composing, on a first layer, a first layer packet data unit, PDU, having a predetermined length, including a plurality of first layer service data units, SDUs, each of the plurality of first layer SDUs including a header indicating a length of each of the first layer SDUs (step S71), inserting a certain number of the plurality of the first layer SDUs into the first layer PDU corresponding to the predetermined length of the first layer PDU (step S72), if it is determined that a last one of the certain number of the plurality of first layer SDUs does not fit completely into the first layer PDU, segmenting the last one of the certain number of the plurality of first layer SDUs according to the predetermined length of the first layer PDU (step S73), and inserting a first part of the segmented first layer SDU into the first layer PDU (step S74), wherein the header indicates the length of the first layer SDU.

According to some example versions of the present invention, the method further comprises composing another first layer PDU having a predetermined length, inserting at least a portion of the remaining part of the segmented first layer SDU into the other first layer PDU, and inserting a header according to the remaining part of the segmented first layer SDU into the other first layer PDU, the header including an indication of a length of the remaining part of the segmented first layer SDU, and an indication indicating the portion of the remaining part of the segmented first layer SDU.

According to some example versions of the present invention, the indication is a segment offset field or a segment sequence number.

According to some example versions of the present invention, the last one of the certain number of the plurality of first layer SDUs refers to the last first layer SDU of the first layer PDU among all logical channels between the first layer and a second layer, and the remaining part of the segmented first layer SDU refers to the remaining part of the segmented first layer SDU for the last logical channel of the first layer PDU.

According to some example versions of the present invention, the last one of the certain number of the plurality of first layer SDUs refers to the last first layer SDU of any one of logical channels between the first layer and a second layer, and the remaining part of the segmented first layer SDU refers to the remaining part of the segmented first layer SDU of the one of logical channels between the first layer and the second layer.

According to some example versions of the present invention, the first layer PDU comprises a plurality of sub-PDUs each corresponding to a logical channel, and the last one of the certain number of the plurality of first layer SDUs refers to the last first layer SDU of the sub-PDU.

According to some example versions of the present invention, each of the plurality of sub-PDUs includes a field indicating the size of the sub-PDU, or each of the plurality of first layer PDUs includes at least one field indicating the size of each of the sub-PDUs.

According to some example versions of the present invention, the size of the sub-PDU is indicated based on network scheduling.

According to some example versions of the present invention, the first layer is a medium access control, MAC, layer, and the second layer is a radio link control, RLC, layer.

According to some example versions of the present invention, the transmitting apparatus is a base station, an access point or a user equipment in a mobile communication network.

Figure 8:
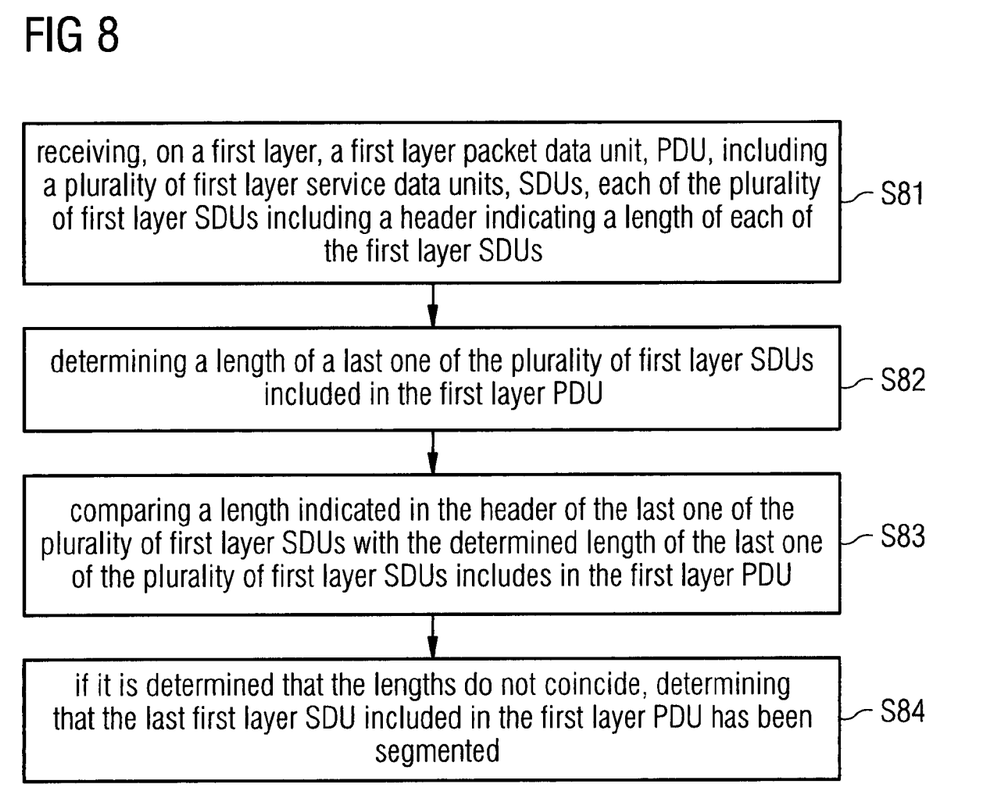
FIG. 8 is a flowchart illustrating another example of a method according to certain aspects of the present invention.

FIG. 8 is a flowchart illustrating another example of a method according to example versions of the present invention.

According to example versions of the present invention, the method may be implemented in a receiving apparatus, like a base station, access point, user equipment or the like. The method comprises receiving, on a first layer, a first layer packet data unit, PDU, including a plurality of first layer service data units, SDUs, each of the plurality of first layer SDUs including a header indicating a length of each of the first layer SDUs (step S81), determining a length of a last one of the plurality of first layer SDUs included in the first layer PDU (step S82), comparing a length indicated in the header of the last one of the plurality of first layer SDUs with the determined length of the last one of the plurality of first layer SDUs includes in the first layer PDU (step S83), and if it is determined that the lengths do not coincide, determining that the last first layer SDU included in the first layer PDU has been segmented (step S84).

According to some example versions of the present invention, the first layer PDU comprises a plurality of sub-PDUs each corresponding to a logical channel, and the method further comprises determining a length of a last one of the plurality of first layer SDUs included in one of the sub-PDUs, comparing a length indicated in the header of the last one of the plurality of first layer SDUs included in one of the sub-PDUs with the determined length of the last one of the plurality of first layer SDUs includes in the sub-PDU, and if it is determined that the lengths do not coincide, determining that the last first layer SDU included in one of the sub-PDUs has been segmented.

According to some example versions of the present invention, the size of the sub-PDU is determined based on network based scheduling per logical channel.

According to some example versions of the present invention, information regarding the size of the sub-PDU is included in the received first layer PDU.

According to some example versions of the present invention, forwarding the information regarding the segmented first layer SDU to a second layer of the receiving apparatus, and determining, at the second layer of the receiving apparatus, whether the segmented first layer SDU can be reassembled.

According to some example versions of the present invention, if it is determined that the segmented first layer SDU cannot be reassembled on the second layer, requesting issuance of the missing part of the first layer SDU.

According to some example versions of the present invention, the first layer is a medium access control, MAC, layer, and the second layer is a radio link control, RLC, layer.

According to some example versions of the present invention, the receiving apparatus is a base station, an access point or a user equipment in a mobile communication network.

Figure 9:
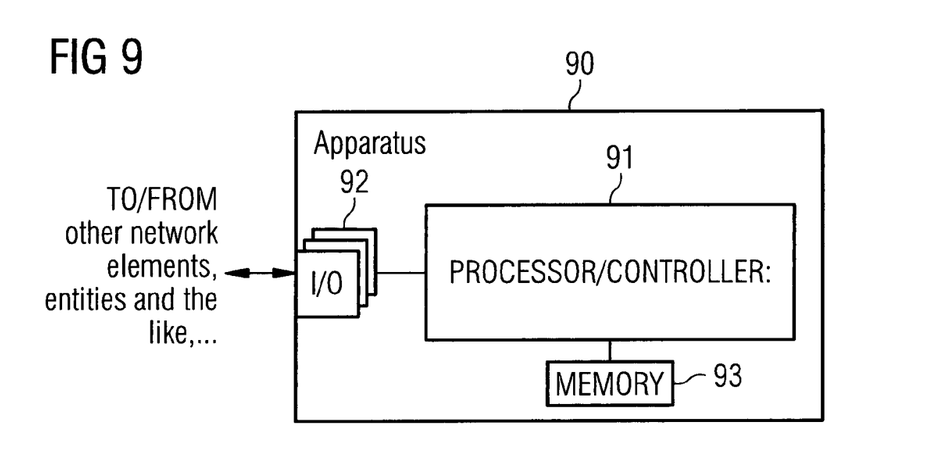
FIG. 9 is block diagram illustrating an example of an apparatus according to certain aspects of the present invention.

FIG. 9 is a block diagram illustrating an example of an apparatus according to some example versions of the present invention.

In FIG. 9, a block circuit diagram illustrating a configuration of an apparatus 90 is shown, which is configured to implement the above described aspects of the invention. It is to be noted that the apparatus 90 shown in FIG. 9 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 90 may comprise a processing function or processor 91, such as a CPU or the like, which executes instructions given by programs or the like. The processor 91 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 92 denotes transceiver or input/output (I/O) units (interfaces) connected to the processor 91. The I/O units 92 may be used for communicating with one or more other network elements, entities, terminals or the like. The I/O units 92 may be a combined unit comprising communication equipment towards several network elements, or may comprise a distributed structure with a plurality of different interfaces for different network elements. The apparatus 90 further comprises at least one memory 93 usable, for example, for storing data and programs to be executed by the processor 91 and/or as a working storage of the processor 91.

The processor 91 is configured to execute processing related to the above described aspects.

In particular, the apparatus 90 may be implemented in or may be part of a transmitting apparatus or the like, and may be configured to perform a method as described in connection with FIG. 7. Thus, the processor 91 is configured to perform composing, on a first layer, a first layer packet data unit, PDU, having a predetermined length, including a plurality of first layer service data units, SDUs, each of the plurality of first layer SDUs including a header indicating a length of each of the first layer SDUs, inserting a certain number of the plurality of the first layer SDUs into the first layer PDU corresponding to the predetermined length of the first layer PDU, if it is determined that a last one of the certain number of the plurality of first layer SDUs does not fit completely into the first layer PDU, segmenting the last one of the certain number of the plurality of first layer SDUs according to the predetermined length of the first layer PDU, and inserting a first part of the segmented first layer SDU into the first layer PDU, wherein the header indicates the length of the first layer SDU Further, the apparatus 90 may be implemented in or may be part of a receiving apparatus or the like, and may be configured to perform a method as described in connection with FIG. 8. Thus, the processor 91 is configured to perform receiving, on a first layer, a first layer packet data unit, PDU, including a plurality of first layer service data units, SDUs, each of the plurality of first layer SDUs including a header indicating a length of each of the first layer SDUs, determining a length of a last one of the plurality of first layer SDUs included in the first layer PDU, comparing a length indicated in the header of the last one of the plurality of first layer SDUs with the determined length of the last one of the plurality of first layer SDUs includes in the first layer PDU, and if it is determined that the lengths do not coincide, determining that the last first layer SDU included in the first layer PDU has been segmented.

For further details regarding the functions of the apparatus 90, reference is made to the description of the methods according to some example versions of the present invention as described in connection with FIGS. 7 and 8.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus/processor (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

ABBREVIATIONS

AM Acknowledged Mode
ARQ Automatic Repeat Request
CE Control Element
HARQ Hybrid ARQ
HSDPA High Speed Downlink Packet Access
LCID Logical Channel Identifier
MAC Medium Access Control
NW Network
PDCP Packet Data Convergence Protocol
PDU Protocol Data Unit
RLC Radio Link Control
RRC Radio Resource Control
RT Real Time
SDU Service Data Unit
SN Sequence Number
TB Transport Block
TTI Transmission Time Interval
UE User Equipment UL Uplink
UM Unacknowledged Mode

The invention claimed is:

1. A method for use in a transmitting apparatus, comprising:
composing, on a medium access control (MAC) layer, a MAC layer packet data unit, PDU, having a predetermined length, including a plurality of MAC layer service data units, SDUs, each of the plurality of MAC layer SDUs including a header indicating a length of each of the MAC layer SDUs,
inserting a certain number of the plurality of the MAC layer SDUs into the MAC layer PDU corresponding to the predetermined length of the MAC layer PDU,
determining a remaining portion of the MAC layer PDU,
determining whether a last one of the certain number of the plurality of MAC layer SDUs does not fit completely into the remaining portion of the MAC layer PDU,
in response to determining the last one of the certain number of the plurality of MAC layer SDUs does not fit completely into the remaining portion of the MAC layer PDU, segmenting the last one of the certain number of the plurality of MAC layer SDUs into a first part and a second part according to the predetermined length of the MAC layer PDU, and
inserting the first part of the segmented MAC layer SDU into the remaining portion of the MAC layer PDU without changing the header field of the MAC layer PDU such that the header of the MAC layer PDU indicates the original length of the MAC layer SDU.

2. The method according to claim 1, further comprising:
composing another MAC layer PDU having a predetermined length, and
inserting at least a portion of the second part of the segmented MAC layer SDU into the another MAC layer PDU, and
inserting a header according to the at least a portion of the second part of the segmented MAC layer SDU into the another MAC layer PDU, the header including an indication of a length of the at least a portion of the second part of the segmented MAC layer SDU, and an indication indicating the at least a portion of the second part of the segmented MAC layer SDU.

3. The method according to claim 1, wherein the indication is a segment offset field or a segment sequence number.

4. The method according to claim 1, wherein
the last one of the certain number of the plurality of MAC layer SDUs refers to the last MAC layer SDU of the MAC layer PDU among all logical channels between the MAC layer and a radio link control (RLC) layer, and
the second part of the segmented MAC layer SDU refers to a remaining part of the segmented MAC layer SDU for the last logical channel of the MAC layer PDU.

5. The method according to claim 1, wherein
the last one of the certain number of the plurality of MAC layer SDUs refers to the last MAC layer SDU of any one of logical channels between the MAC layer and a RLC layer, and
the second part of the segmented MAC layer SDU refers to a remaining part of the segmented MAC layer SDU of the one of logical channels between the MAC layer and the RLC layer, the method further comprising regenerating a RLC header to indicate an RLC PDU is segmented into at least two segments.

6. The method according to claim 5, wherein
the MAC layer PDU comprises a plurality of sub-PDUs each corresponding to a logical channel, and
the last one of the certain number of the plurality of MAC layer SDUs refers to the last MAC layer SDU of the sub-PDU.

7. The method according to claim 6, wherein
each of the plurality of sub-PDUs includes a field indicating the size of the sub-PDU, or
each of the plurality of MAC layer PDUs includes at least one field indicating the size of each of the sub-PDUs; and
wherein the size of the sub-PDU is indicated based on network scheduling.

8. A method for use in a receiving apparatus, comprising:
receiving, on a medium access control (MAC) layer, a MAC layer packet data unit, PDU, including a plurality of MAC layer service data units, SDUs, each of the plurality of MAC layer SDUs including a header indicating a length of each of the MAC layer SDUs,
determining a length of a last one of the plurality of MAC layer SDUs included in the MAC layer PDU, the length of a last one of the plurality of MAC layer SDUs being equal to the full length of the corresponding SDU packet,
comparing a length indicated in the header of the last one of the plurality of MAC layer SDUs with the determined length of the last one of the plurality of MAC layer SDUs includes in the MAC layer PDU,
determining whether the length indicated in the header of the last one of the plurality of MAC layer SDUs is equal to the determined length of the last one of the plurality of MAC layer SDUs, and
in response to determining that the lengths are not equal, determining that the last MAC layer SDU included in the MAC layer PDU has been segmented into a first SDU part and at least one second SDU part.

9. The method according to claim 8, wherein
the MAC layer PDU comprises a plurality of sub-PDUs each corresponding to a logical channel, and the method further comprises
determining a length of a last one of the plurality of MAC layer SDUs included in one of the sub-PDUs,
comparing a length indicated in the header of the last one of the plurality of MAC layer SDUs included in one of the sub-PDUs with the determined length of the last one of the plurality of MAC layer SDUs includes in the sub-PDU, and
if it is determined that the lengths do not coincide, determining that the last MAC layer SDU included in one of the sub-PDUs has been segmented.

10. The method according to claim 8, further comprising:
forwarding information regarding the segmented MAC layer SDU to a radio link control (RLC) layer of the receiving apparatus, and
determining, at the RLC layer of the receiving apparatus, whether the segmented MAC layer SDU can be reassembled.

11. The method according to claim 10, wherein
if it is determined that the segmented MAC layer SDU cannot be reassembled on the RLC layer,
requesting issuance of at least one missing part of the MAC layer SDU.

12. A transmitting apparatus, comprising:
at least one processor, and
at least one memory for storing instructions to be executed by the processor, wherein the at least one memory and the instructions are configured to, with the at least one processor, cause the apparatus at least to perform:
composing, on a medium access control (MAC) layer, a MAC layer packet data unit, PDU, having a predetermined length, including a plurality of MAC layer service data units, SDUs, each of the plurality of MAC layer SDUs including a header indicating a length of each of the MAC layer SDUs, and
inserting a certain number of the plurality of the MAC layer SDUs into the MAC layer PDU corresponding to the predetermined length of the MAC layer PDU,
determining a remaining portion of the MAC layer PDU,
determining whether a last one of the certain number of the plurality of MAC layer SDUs does not fit completely into the remaining portion of the MAC layer PDU,
in response to determining the last one of the certain number of the plurality of MAC layer SDUs does not fit completely into the remaining portion of the MAC layer PDU, segmenting the last one of the certain number of the plurality of MAC layer SDUs into a first part and a second part according to the predetermined length of the MAC layer PDU, and
inserting the first part of the segmented MAC layer SDU into the remaining portion of the MAC layer PDU without changing the header field of the MAC layer PDU such that the header of the MAC layer PDU indicates the original length of the MAC layer SDU.

13. The transmitting apparatus according to claim 12, wherein the at least one memory and the instructions are further configured to, with the at least one processor, cause the apparatus at least to perform:
composing another MAC layer PDU having a predetermined length, and
inserting at least a portion of the second part of the segmented MAC layer SDU into the another MAC layer PDU, and
inserting a header according to the at least a portion of the second part of the segmented MAC layer SDU into the another MAC layer PDU, the header including an indication of a length of the at least a portion of the second part of the segmented MAC layer SDU, and an indication indicating the at least a portion of second part of the segmented MAC layer SDU.

14. The transmitting apparatus according to claim 12, wherein the indication is a segment offset field or a segment sequence number.

15. The transmitting apparatus according to claim 12, wherein
the last one of the certain number of the plurality of MAC layer SDUs refers to the last MAC layer SDU of the MAC layer PDU among all logical channels between the MAC layer and a radio link control (RLC) layer, and
the second part of the segmented MAC layer SDU refers to the second part of the segmented MAC layer SDU for the last logical channel of the MAC layer PDU.

16. The transmitting apparatus according to claim 12, wherein
the last one of the certain number of the plurality of MAC layer SDUs refers to the last MAC layer SDU of any one of logical channels between the MAC layer and a RLC layer, and
the second part of the segmented MAC layer SDU refers to a remaining part of the segmented MAC layer SDU of the one of logical channels between the MAC layer and the RLC layer.

17. The transmitting apparatus according to claim 16, wherein
the MAC layer PDU comprises a plurality of sub-PDUs each corresponding to a logical channel, and
the last one of the certain number of the plurality of MAC layer SDUs refers to the last MAC layer SDU of the sub-PDU.

18. The transmitting apparatus according to claim 17, wherein
each of the plurality of sub-PDUs includes a field indicating the size of the sub-PDU, or
each of the plurality of MAC layer PDUs includes at least one field indicating the size of each of the sub-PDUs; and
wherein the size of the sub-PDU is indicated based on network scheduling.

19. A computer program product including a program for a processing device, comprising software code portions for performing the method of claim 1 when the program is run on the processing device, wherein the computer program product comprises a computer-readable medium on which the software code portions are stored, and wherein the program is directly loadable into an internal memory of the processing device.

* * * * *